(12) United States Patent
Kim et al.

(10) Patent No.: US 7,990,487 B2
(45) Date of Patent: Aug. 2, 2011

(54) LIQUID CRYSTAL DISPLAY AND A METHOD OF ASSEMBLING THE LIQUID CRYSTAL DISPLAY

(75) Inventors: Taek-young Kim, Hwaseong-si (KR); Jin-woo Park, Yougin-si (KR)

(73) Assignee: Samsung Electronics Co., Ltd. (KR)

( * ) Notice: Subject to any disclaimer, the term of this patent is extended or adjusted under 35 U.S.C. 154(b) by 857 days.

(21) Appl. No.: 11/488,238

(22) Filed: Jul. 18, 2006

(65) Prior Publication Data
US 2007/0132905 A1 Jun. 14, 2007

(30) Foreign Application Priority Data
Dec. 14, 2005 (KR) .................. 10-2005-0123341

(51) Int. Cl.
*G02F 1/1333* (2006.01)
(52) U.S. Cl. .......................... 349/58; 349/56
(58) Field of Classification Search .......... 349/56, 349/58
See application file for complete search history.

(56) References Cited

U.S. PATENT DOCUMENTS

| | | | |
|---|---|---|---|
| 6,504,586 B1 * | 1/2003 | Lee | 349/58 |
| 6,593,979 B1 * | 7/2003 | Ha et al. | 349/58 |
| 6,667,780 B2 * | 12/2003 | Cho | 349/58 |
| 6,854,856 B2 * | 2/2005 | Shin et al. | 362/613 |
| 7,068,331 B2 * | 6/2006 | Kim | 349/58 |
| 7,184,110 B2 * | 2/2007 | Kim et al. | 349/58 |
| 7,426,106 B2 * | 9/2008 | Nakagawa et al. | 361/681 |
| 2001/0019377 A1 * | 9/2001 | Fukayama et al. | 349/58 |
| 2002/0001184 A1 | 1/2002 | Kim et al. | |
| 2002/0054249 A1 * | 5/2002 | Ryu et al. | 349/58 |
| 2004/0212755 A1 * | 10/2004 | Fukayama et al. | 349/58 |
| 2004/0212756 A1 * | 10/2004 | Fukayama et al. | 349/58 |
| 2005/0099555 A1 * | 5/2005 | Kim | 349/58 |
| 2005/0140844 A1 * | 6/2005 | Won et al. | 349/58 |
| 2006/0072050 A1 * | 4/2006 | Lee | 349/58 |
| 2006/0103774 A1 * | 5/2006 | Han et al. | 349/58 |

FOREIGN PATENT DOCUMENTS

| | | |
|---|---|---|
| JP | 11-271719 | 10/1999 |
| JP | 2002-31791 | 1/2002 |
| KR | 2002-0031895 | 5/2002 |

OTHER PUBLICATIONS

Chinese Office Action for application No. 200610127804.3 dated Jun. 19, 2009 with English translation.

* cited by examiner

*Primary Examiner* — Brian M. Healy
*Assistant Examiner* — Mary A El-Shammaa
(74) *Attorney, Agent, or Firm* — Cantor Colburn LLP

(57) ABSTRACT

A liquid crystal display ("LCD") having a maximum effective display area is provided by improving an assembling structure of the LCD. The LCD includes a liquid crystal display (LCD) panel assembly including a liquid crystal display (LCD) panel, a data driver transmitting a data driving signal to the LCD panel, and a gate driver transmitting a gate driving signal to the LCD panel, a mold frame having sidewalls and receiving the LCD panel assembly therein, the mold frame including a protruding portion protruding on top of at least one of the sidewalls, the protruding portion formed to be higher than the LCD panel assembly, and a front cover positioned outside the mold frame, a first bent portion of the front cover surrounding the protruding portion, and a distal end of the first bent portion contacting the LCD panel.

27 Claims, 7 Drawing Sheets

US 7,990,487 B2

LIQUID CRYSTAL DISPLAY AND A METHOD OF ASSEMBLING THE LIQUID CRYSTAL DISPLAY

This application claims priority to Korean Patent Application No. 10-2005-0123341, filed on Dec. 14, 2005 and all the benefits accruing therefrom under 35 U.S.C. §119, and the contents of which in its entirety are herein incorporated by reference.

BACKGROUND OF THE INVENTION

1. Field of the Invention

The present invention relates to a liquid crystal display ("LCD") and a method of assembling the LCD, and more particularly, to an LCD having a maximum effective display area by improving an assembling structure of the LCD and a method of assembling the LCD.

2. Description of the Related Art

Generally, an LCD is one of the most widely used flat panel displays. The LCD displays an image using liquid crystal.

The LCD includes an LCD panel provided with a plurality of gate lines and a plurality of data lines, a gate driver supplying the plurality of gate lines with gate driving signals, and a data driver supplying the plurality of data lines with data driving signals. The gate and data drivers are mounted in chip types or attached to the LCD panel using a tape carrier package ("TCP").

In recent years, to enlarge an effective display area of an LCD, there has been proposed a structure in which a gate driver is directly incorporated onto an LCD panel. In such a conventional LCD structure, since no gate driving chip is necessary, the effective display area of the LCD panel can be enlarged to some extent. However, in the conventional LCD structure, which encloses the LCD panel and includes a receiving container comprising the LCD, an area overlapped by the receiving container and the LCD panel is considerably large, so that the effective display area of the LCD panel cannot be maximized.

BRIEF SUMMARY OF THE INVENTION

Exemplary embodiments of the present invention provide a liquid crystal display ("LCD") having a maximum effective display area by improving an assembling structure of the LCD and a method of assembling the LCD.

This as well as other features and advantages of the present invention will become clear to those skilled in the art upon review of the following description.

According to exemplary embodiments of the present invention, there is provided an LCD including an LCD panel assembly including an LCD panel, a data driver transmitting a data driving signal to the LCD panel, and a gate driver transmitting a gate driving signal to the LCD panel, a mold frame having and receiving the LCD panel assembly therein, the mold frame including a protruding portion protruding on top of at least one of the sidewalls, the protruding portion formed to be higher than the LCD panel assembly, and a front cover positioned outside the mold frame, a first bent portion of the front cover surrounding the protruding portion, and a distal end of the first bent portion contacting the LCD panel.

According to other exemplary embodiments of the present invention, there is provided an LCD including an LCD panel assembly including a rectangular LCD panel having a long side and a short side, a data driver attached to the long side of the LCD panel and transmitting a data driving signal to the LCD panel, and a gate driver patterned in an integrated circuit type on the short side of the LCD panel and transmitting a gate driving signal to the LCD panel, a mold frame receiving the LCD panel assembly therein and including a protruding portion protruding on top of a sidewall of the mold frame in a vicinity of the short side of the LCD panel, the protruding portion formed to be higher than the LCD panel assembly, a front cover positioned outside the mold frame, a first bent portion of the front cover surrounding the protruding portion, and a distal end of the first bent portion contacting the LCD panel, and a top receiving container positioned between the mold frame and the front cover, a portion of the top receiving container covering a portion of a top surface of the mold frame and securely fixing the LCD panel, the top receiving container also including a plate-shaped sidewall in a vicinity of the short side of the LCD panel, the plate-shaped sidewall formed to be lower than the protruding portion.

According to other exemplary embodiments of the present invention, there is provided a method of assembling a liquid crystal display including providing a mold frame having a protruding portion extending upwardly from a first sidewall and a supporting portion extending inwardly from a second sidewall, placing a liquid crystal display panel on the supporting portion, and positioning a front cover outside of the mold frame, the front cover having a first sidewall corresponding to the first sidewall of the mold frame and a first bent portion extending from the first sidewall of the front cover, a distal end of the first bent portion contacting the liquid crystal display panel.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
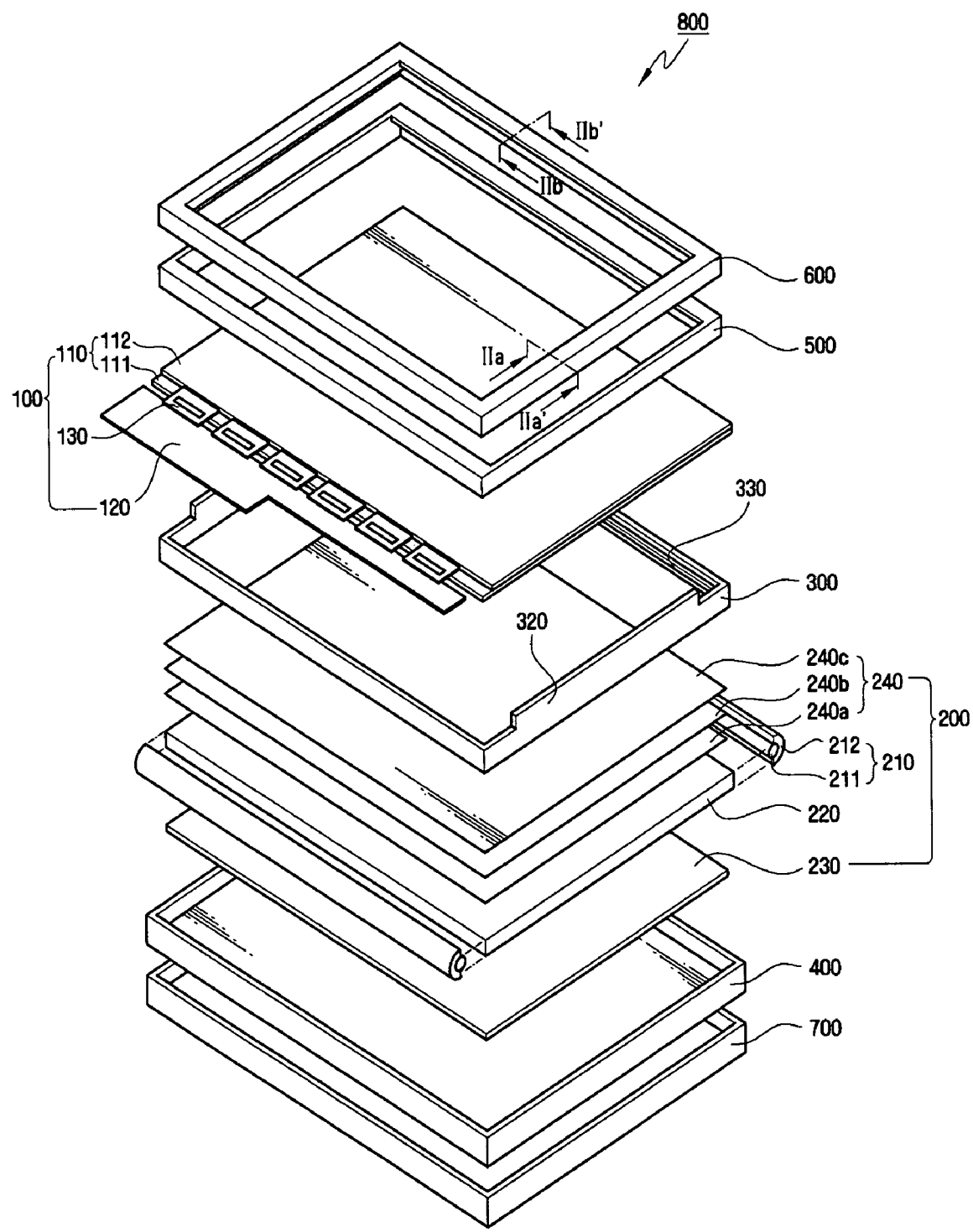
FIG. 1 is an exploded perspective view of an exemplary liquid crystal display ("LCD") according to an exemplary embodiment of the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

The present invention is described hereinafter with reference to illustrations of an exemplary liquid crystal display ("LCD") according to exemplary embodiments of the invention.

Figure 2A:
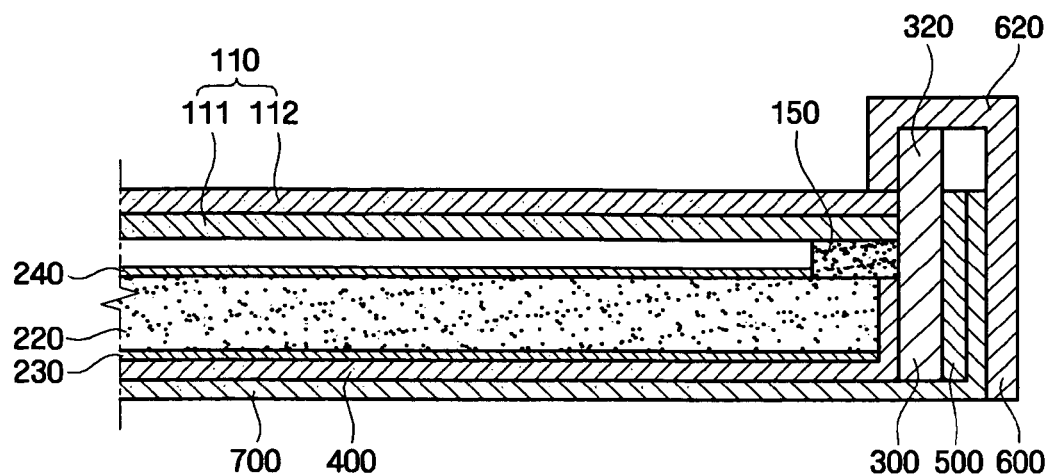
FIG. 2A is a cross-sectional view taken along line IIa-IIa' of FIG. 1.
Figure 2B:
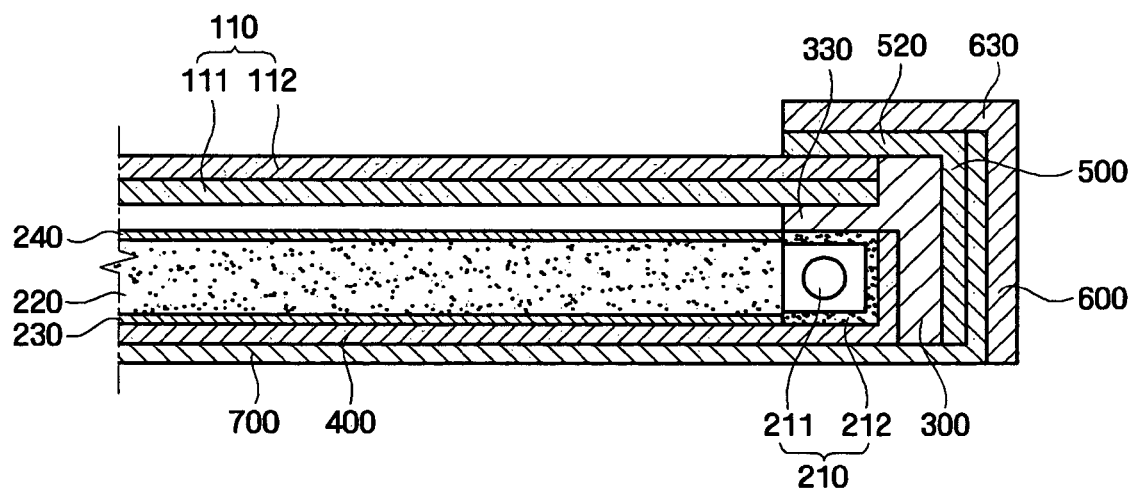
FIG. 2B is a cross-sectional view taken along line IIb-IIb' of FIG. 1.

FIG. 1 is an exploded perspective view of an exemplary LCD 800 according to an exemplary embodiment of the present invention, FIG. 2A is a cross-sectional view taken along line IIa-IIa' of FIG. 1, and FIG. 2B is a cross-sectional view taken along line IIb-IIb' of FIG. 1.

Referring to FIGS. 1 through 2B, the LCD 800 includes an LCD panel assembly 100, a backlight assembly 200, a mold frame 300, a bottom receiving container 400, a top receiving container 500, and front/rear covers 600 and 700.

The LCD panel assembly 100 includes an LCD panel 110, and a driving assembly including a gate driver (not shown), a data driver 130, and a print circuit board ("PCB") 120.

The LCD panel 110 has a rectangular shape including opposing long sides and short sides and displays an image. The LCD panel 110 includes a first plate 111, a second plate 112, and a liquid crystal layer (not shown) disposed between the first plate 111 and the second plate 112.

On the first plate 111 are formed a plurality of gate lines spaced a predetermined gap apart from one another and extending in a first direction and plurality of data lines arranged in a predetermined interval and extending in a second direction so as to intersect the gate lines. The first direction may be substantially perpendicular to the second direction. In the illustrated embodiment, the first direction may extend substantially parallel to the long sides of the LCD panel 110, and the second direction may extend substantially parallel to the short sides of the LCD panel 110. Pixel regions are defined in a matrix by intersecting pairs of the gate lines and the data lines. Pixel electrodes are formed at the pixel regions, and thin film transistors ("TFTs") switched by signals supplied from the gate lines and transmitting signals supplied from the data lines to the respective pixel electrodes are also formed at the pixel regions.

At one side of the first plate 111 are formed pads (not shown) to which the data driver 130 is attached, to supply the data lines with driving signals. The gate driver (not shown) for supplying the gate lines with driving signals, which is patterned in an integrated circuit type, is formed on the other side of the first plate 111. For example, the gate driver may be formed on a side perpendicular to the side of the first plate 111 to which the data driver 130 is attached.

On the second plate 112, which faces and is connected to the first plate 111, is formed a black matrix for blocking light from areas other than pixel areas, RGB color filter patterns for a color display, a common electrode for image representation, and a light blocking pattern for dividing effective display areas of the LCD panel 110.

The light blocking pattern is formed in flange patterns along the periphery of the second plate 112. The LCD panel 110 displays an image only within an interior surface of the blocking pattern. In addition, the light blocking pattern covers the gate driver (not shown) of the first plate 111.

A predetermined gap between the first and second plates 111 and 112 is maintained by a spacer and the first and second plates 111 and 112 supported by the spacer are sealed together by a sealant or glass frit. A liquid crystal layer (not shown) having optical anisotropy is formed between the first and second plates 111 and 112.

As described above, the gate driver, hidden from view by the second plate 112, is patterned in an integrated circuit type, is formed on the first plate 111 of the LCD panel 110, such as along a short side of the first plate 111, and transmits the gate driving signals to the gate lines of the first plate 111.

The data driver 130 is connected to the pads formed on the first plate 111 and transmits the driving signals to the data lines. The data driver 130 includes a plurality of wire patterns formed on a flexible base film and a driving IC connected to the plurality of wire patterns. Here, one end of the flexible base film is connected with the pads of the LCD panel 110 using an anisotropic conductive film ("ACF") and the other end thereof is connected with the PCB 120. Driving and control signals of the LCD panel 110, which are supplied from the PCB 120 is transmitted to the LCD panel 110 through the data driver 130.

The PCB 120 connected with the data driver 130, generates the driving and control signals of the LCD panel 110 and transmits the same to the LCD panel 110 through the data driver 130. The PCB 120 has multiple electronic elements mounted thereon.

The PCB 120, the data driver 130, and the gate driver integrated on the first plate 111 apply driving signals and timing signals to the gate lines and data lines of the first plate 111 to control orientation angles and timings of liquid crystals.

The LCD panel assembly 100 having the aforementioned configuration is seated and received in the mold frame 300.

The mold frame 300 has a receiving space to receive the LCD panel assembly 100 and may be made of, for example, an insulating synthetic resin. In addition, the mold frame 300 includes a supporting portion 330 on which the LCD panel 110 is seated and may further be sealed and a protruding portion 320 for preventing fluctuation of the LCD panel 110. The long sides of the LCD panel 110, to which the data driver 130 is attached, are fixed with the supporting portion 330 and the short sides of the LCD panel 110, to which the gate driver is formed, are received by sidewalls of the mold frame 300 having the protruding portion 320. In other words, the protruding portions 320 protrude from the top ends of the sidewalls of the mold frame 300 in the vicinity of the short sides of the LCD panel 110. Here, the protruding portions 320 are formed to be higher than the LCD panel assembly 100. That is, when the LCD panel assembly 100 is seated on the supporting portion 330 of the mold frame 300 as shown in FIG. 2B, the protruding portions 320 extend beyond the substantially planar surface of the LCD panel 110, as shown in FIG. 2A. In other words, a thickness of the LCD 800 measured at the LCD panel 110 is less than a thickness of the LCD 800 measured at the protruding portion 320.

The inner surface of the sidewall of the mold frame 300 is combined with the bottom receiving container 400 and the outer surface of the sidewall of the mold frame 300 is combined with the top receiving container 500. The mold frame 300 may be modified into various shapes according to how to receive the LCD panel 110 and the backlight assembly 200, which will later be described in greater detail with reference to FIGS. 3A to 4C.

The backlight assembly 200 is disposed below the mold frame 300 and provides light to the LCD panel 110.

The backlight assembly 200 is received in the bottom receiving container 400. When the mold frame 300 and the bottom receiving container 400 are combined with each other, the backlight assembly 200 is secured to the bottom receiving container 400 by the mold frame 300. As illustrated, the supporting portion 330 of the mold frame 300 may overlap a light source unit 210 of the backlight assembly 200. The backlight assembly 200 includes the light source unit 210, a light guide plate 220, a reflective sheet 230, and optical sheets 240.

The light source unit 210 is disposed along at least one side of the light guide plate 220 and includes a light source 211 and a light source cover 212 covering the light source 211. As the light source 211, a linear light source such as a cold cathode fluorescent lamp ("CCFL") or a hot cathode fluorescent lamp ("HCFL") or a point light source such as a light emitting diode ("LED") may be used. In the illustrative embodiment, a CCFL is used as the light source 211.

Meanwhile, the light source unit 210 may be disposed along one long or short side or two adjacent or opposing sides of the light guide plate 220. FIG. 1 shows an example in which two light source units 210 are disposed along either of two opposing long sides of the light guide plate 220.

The light guide plate 220 has a rectangular shape and guides light emitted by the light source unit 210 upwards from the backlight assembly 200, i.e., toward the LCD panel assembly 100.

The light guide plate 220 is made of a highly refractive and transmissive material, e.g., polymethylmethacrylate ("PMMA"), polycarbonate ("PC") or polyethylene ("PE").

A light-scattering pattern is formed on a bottom surface of the light guide plate 220 to direct light, incident from the side of the light guide plate 220, in an upwards direction. The light-scattering pattern may be formed, for example, by patterning a scattering material coated on the bottom surface of the light guide plate 220, forming a curve on the bottom surface thereof, or using other methods.

The reflective sheet 230 is disposed below the light guide plate 220, such as between the bottom surface of the light guide plate 220 and a bottom plate of the bottom receiving container 400. The reflective sheet 230 reflects light passing downward through the bottom surface of the light guide plate 220 upwards from the light guide plate 220, thereby increasing the brightness of the backlight assembly 200 while allowing light to be emitted uniformly upward from the light guide plate 220.

The reflective sheet 230 may be made of a slim, highly elastic and reflective material. For example, the reflective sheet 230 may be, a 0.01 to 5 mm thick polyethylene terephtalate ("PET") sheet, but not limited thereto. When necessary, the reflective sheet 230 may further be provided with a reflective layer coated on a slim, highly elastic material.

The optical sheets 240 are disposed above the light guide plate 220 and uniformly irradiate light guided by the light guide plate 220 upward from the backlight assembly 200 and towards the LCD panel 110. For example, the optical sheets 240 may be formed by selectively stacking one or more diffusion sheets 240c, prism sheets 240a and 240b, or protective sheets (not shown). While a particular arrangement of optical sheets 240 is shown, the optical sheets 240 may be formed of a single optical sheet or a plurality of the same optical sheets. The stacking order of the optical sheet(s) may vary within a range in which uniformity of light can be increased. The optical sheets 240 may be formed of transparent resin such as acrylic resin, polyurethane resin, or silicon resin.

The backlight assembly 200 having the aforementioned configuration is spaced a predetermined distance apart from the LCD panel 110 received in the mold frame 300. Here, the LCD panel 110 and the backlight assembly 200 disposed in the vicinity of the supporting portion 330 of the mold frame 300 are spaced apart from each other by the supporting portion 330, as shown in FIG. 2B. In other words, the LCD panel 110 is spaced from the backlight assembly 200 by the supporting portion 330 along the sides of the mold frame 300 having the supporting portions 330. The LCD panel 110 and the backlight assembly 200 disposed in the vicinity of the protruding portion 320 of the mold frame 300 are spaced apart from each other by an adhesive fixing material or a fixing tape 150 interposed there between. In other words, the LCD panel 110 is spaced from the backlight assembly 200 by the adhesive fixing material or fixing tape 150 along the sides of the mold frame 300 having the protruding portions 320.

Here, the adhesive fixing material or a fixing tape 150 is preferably adhered so as to overlap with the light blocking pattern of the LCD panel 110. In addition, the adhesive fixing material or a fixing tape 150 preferably has the same height as the supporting portion 330 of the mold frame 300 for maintaining a substantially uniform spacing between the LCD panel 110 and the backlight assembly 200.

The bottom receiving container 400 has a predetermined inner space to receive the backlight assembly 200, and is combined with the mold frame 300 to securely support various components of the backlight assembly 200.

The PCB 120 connected to the data driver 130 of the LCD panel 110 is bent to the rear surface of the bottom receiving container 400. The bottom receiving container 400 may be made of a metal such as, but not limited to, aluminum (Al) or Al alloy.

The top receiving container 500 is positioned between the mold frame 300 and the front cover 600 and portions of the top receiving container 500 cover the top portion of the mold frame 300 to fix the LCD panel 110 in place on the mold frame 300. In other words, the top receiving container 500 is combined with the mold frame 300 to receive the LCD panel assembly 100 and the backlight assembly 200, prevents deviation of the LCD panel 110 and defines an effective display area of the LCD panel 110.

The top receiving container 500 has four sidewalls combined with the mold frame 300. Here, the sidewalls of the top receiving container 500 in the vicinity of the short side of the LCD panel 110 is formed lower than the protruding portion 320 of the mold frame 300, and is plate-shaped. In addition, the other sidewalls of the top receiving container 500 in the vicinity of the long side of the LCD panel 110 are bent to fix the top surface of the LCD panel 110 relative to the mold frame 300. The top receiving container 500 will later be described in greater detail with reference to FIGS. 5A-5C.

The top receiving container 500 may be made of the same material as the bottom receiving container 400, for example, a metal such as aluminum (Al) or Al alloy. Here, the combination between the top receiving container 500 and the mold frame 300 may be made using a hook or a screw, but is not limited thereto.

The front cover 600 surrounds the front surface and sidewalls of the top receiving container 500 and is combined with the rear cover 700 from the rear surface of the bottom receiving container 400 to complete the outer frame of the LCD 800.

The front cover 600 is positioned outside the mold frame 300, and is bent at opposing sides thereof so as to surround the protruding portion 320 of the mold frame 300 from the outer surface of the mold frame 300. Here, the distal ends of the bent front cover 600 are in contact with the LCD panel 110 and securely fix the LCD panel 110 relative to the backlight assembly 200 such as by trapping the LCD panel 110 between the distal end portions of the bent front cover 600 and the fixing tape 150. In addition, bent portions are formed on two sidewalls of the front cover 600, that is, on the sidewalls of the front cover 600 corresponding to the sidewalls where the supporting portion 330 of the mold frame 300 is formed. Here, the distal ends of the bent front cover 600 are in contact with the bent portion of the top receiving container 500. The front cover 600 will later be described in greater detail with reference to FIGS. 6A to 7C.

Figure 3A:
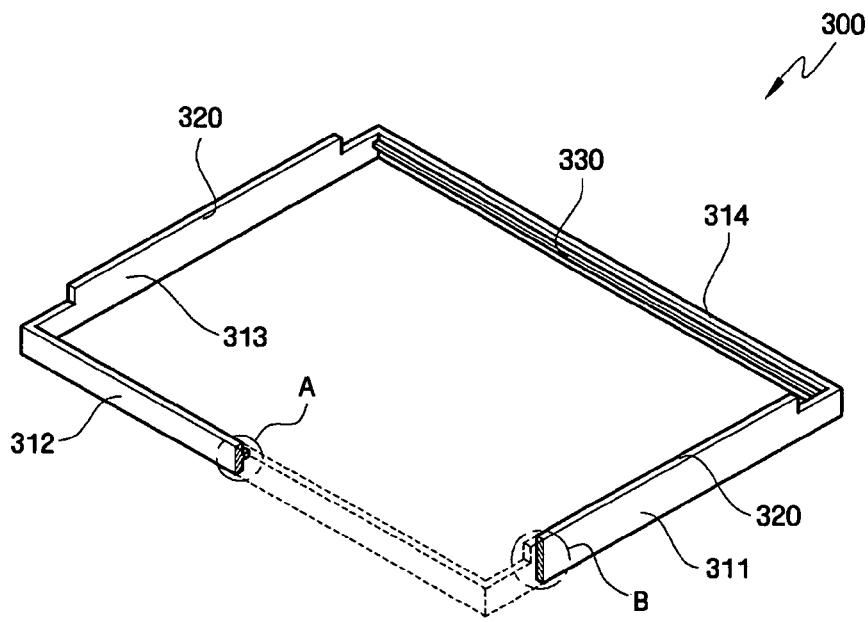
FIG. 3A is a partly cut-away perspective view illustrating an exemplary mold frame shown in FIG. 1.
Figure 3B:
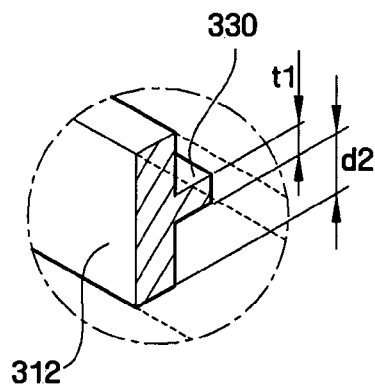
FIGS. 3B and 3C are enlarged perspective views of portions A and B, respectively, of FIG. 3A.
Figure 3C:
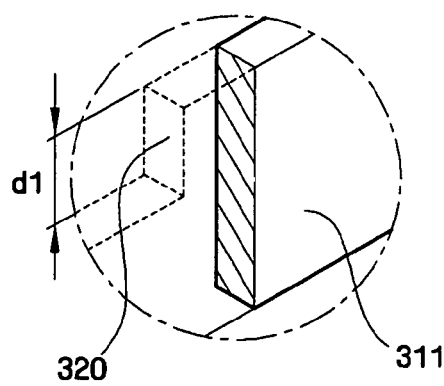

FIG. 3A is a partly cut-away perspective view illustrating an exemplary mold frame shown in FIG. 1. FIGS. 3B and 3C are enlarged perspective views of portions A and B, respectively, of FIG. 3A.

Referring to FIGS. 2A, 2B, 3A, 3B, and 3C, the mold frame 300 has a rectangular inner receiving space to receive the LCD panel assembly 100 therein. The mold frame 300 includes first, second, third, and fourth sidewalls 311, 312, 313 and 314. Lower inner surfaces of the sidewalls 311, 312, 313 and 314 for the mold frame 300 are combined with outer surfaces of the sidewalls of the bottom receiving container 400 to securely fix the backlight assembly 200 received in the bottom receiving container 400. Outer surfaces of the sidewalls 311, 312, 313, 314 of the mold frame 300 are combined with inner surfaces of sidewalls of the top receiving container 500 to securely fix the LCD panel 110. The mold frame 300 may be made of an insulating synthetic resin.

In addition, the mold frame 300 includes the supporting portion 330 on which the LCD panel 110 is seated and sealed and the protruding portion 320 for preventing fluctuation of the LCD panel 110. Here, the protruding portion 320 protrudes from the top end of the first and third sidewalls 311, 313 of the mold frame 300 in the vicinity of the short sides of the LCD panel 110. The supporting portion 330 is preferably formed on the second and fourth sidewalls 312, 314 of the mold frame 300 in the vicinity of the long sides of the LCD panel 110.

Further, as shown in FIG. 3C, the mold frame 300 includes the protruding portion 320 protruding to a predetermined height d1 on top of the first sidewall 311, as well as the third sidewall 313 facing and opposed to the first sidewall 311, and extending in a length direction of the first and third sidewalls 311, 313. The protruding portion 320 may be centrally positioned between corners of the mold frame 300, such that a bent portion 520 of the top receiving container 500 may overlap with end portions of the first and third sidewalls 311, 313.

Here, the height d1 of the protruding portion 320 is approximately 0.3 to 0.6 mm. The protruding portion 320 prevents fluctuation of the LCD panel 110 and is combined with the front cover 600 in an engaged manner as shown in FIG. 2A. The protruding portion 320 is formed to extend higher than the LCD panel 110. That is, a thickness of the LCD 800 measured from the rear cover 700 to a top surface of the second plate 112 of the LCD panel 110 is less than a thickness of the LCD 800 measured from the rear cover 700 to a top surface of the protruding portion 320. On the contrary, a thickness of the LCD 800 measured from the rear cover 700 to a top surface of the second plate 112 of the LCD panel 110 may be substantially the same as a thickness of the LCD 800 measured from the rear cover 700 to a top surface of the second and fourth sidewalls 312, 314.

The mold frame 300 further includes the supporting portions 330 protruding from the inner surface of the second and fourth sidewalls 312, 314, extending outwardly in a direction perpendicular with the second and fourth sidewalls 312, 314, and extending in a length direction of the second and fourth sidewalls 312, 314.

Here, each supporting portion 330 is formed to a predetermined height d2 from bottom surfaces of the second and fourth sidewalls 312 and 314, preferably substantially the same as the height of the backlight assembly 200, i.e., a sum of thicknesses of the reflective sheet 230 and the light guide plate 220. The height d2 may also include a thickness of a bottom plate of the bottom receiving container 400 as well as the height of the backlight assembly 200, as shown in FIG. 2B. As further shown in FIG. 2B, each supporting portion 330 may extend a distance substantially equal to a combined width of the light source cover 212 and a thickness of the sidewall of the bottom receiving container 400.

Here, one side of the LCD panel 110, that is, the long side of the LCD panel 110, to which the data driver 130 is attached, is seated on the supporting portion 330 extending from the second sidewall 312. An opposite side of the LCD panel 110, that is, the opposing other long side of the LCD panel 110, is seated on the supporting portion 330 extending from the fourth sidewall 314. The supporting portion 330 maintains the LCD panel 110 and the backlight assembly 200 a predetermined distance apart from each other.

The adhesive fixing material or fixing tape 150 maintains a predetermined space between the backlight assembly 200 and the first and third sidewalls 311, 313 of the mold frame 300 not having the supporting portion 330, that is, the short sides of the LCD panel 110 received adjacent the first and third sidewalls 311 and 313, corresponding to a side of the LCD panel 110 where the gate driver is formed and the opposite side thereof.

Here, the adhesive fixing material or a fixing tape 150 is preferably adhered along short sides of the backlight assembly 200 so as to be overlapped by the light blocking pattern of the LCD panel 110. In addition, the adhesive fixing material or a fixing tape 150 preferably has the same thickness t1 as the supporting portion 330 of the mold frame 300 so that the LCD panel 110 is brought into equilibrium during assembling.

The protruding portion 320 and the supporting portion 330 are integrally formed with the sidewalls 311, 312, 313 and 314 of the mold frame 300.

Figure 4A:
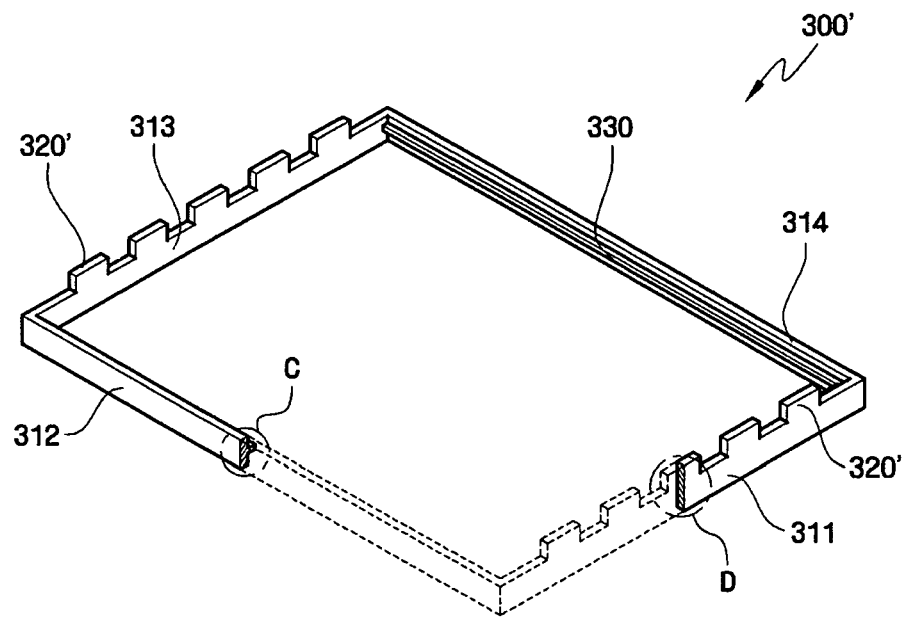
FIG. 4A is a partly cut-away perspective view illustrating a modified example of the exemplary mold frame of FIG. 3A.
Figure 4B:
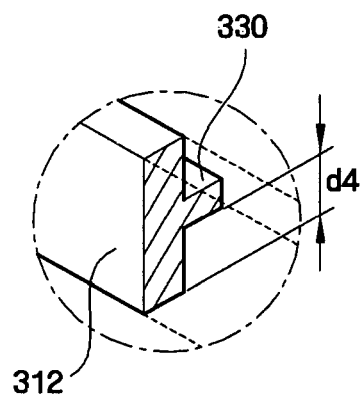
FIGS. 4B and 4C are enlarged perspective views of portions C and D, respectively, of FIG. 4A.
Figure 4C:
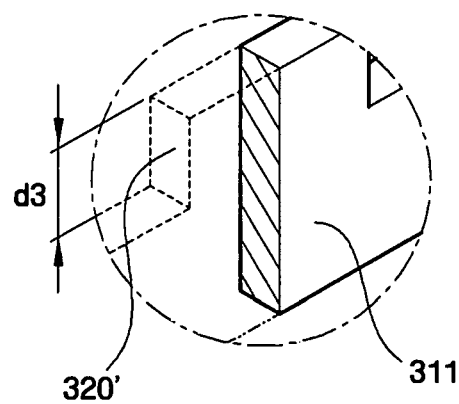

FIG. 4A is a partly cut-away perspective view illustrating a modified example of the exemplary mold frame of FIG. 3A. FIGS. 4B and 4C are enlarged perspective views of portions C and D, respectively, of FIG. 4A.

For brevity, components having the same function for describing the embodiment shown in FIG. 3 are respectively identified by the same reference numerals, and their repetitive description will be omitted. Referring to FIG. 4A, a mold frame according to this exemplary embodiment is basically the same as that according to the previous exemplary embodiment except for the following. That is, the mold frame 300' according to this exemplary embodiment includes a plurality of spaced protruding portions 320' formed on the first and third sidewalls 311 and 313, respectively.

Further, the mold frame 300' includes a plurality of protruding portions 320' formed on the first and third sidewalls 311 and 313, protruding to a predetermined height d3 on top of the first and third sidewalls 311 and 313, and extending in a length direction of the first and third sidewalls 311 and 313. The height d3 may be the same as the height dl of FIG. 3C. The protruding portions 320' may be spaced from each other in the lengthwise direction of the first and third sidewalls 311 and 313.

Here, at least one of the protruding portions 320' may be formed within a length range of the first and third sidewalls 311 and 313. In addition, the protruding portions 320' are preferably formed at locations facing the first and third sidewalls 311 and 313.

The supporting portion 330 of the mold frame 300' may be the same as the supporting portion 330 of the mold frame 300, and the height d4 may be substantially the same as the height d2 of FIG. 3B.

Figure 5A:
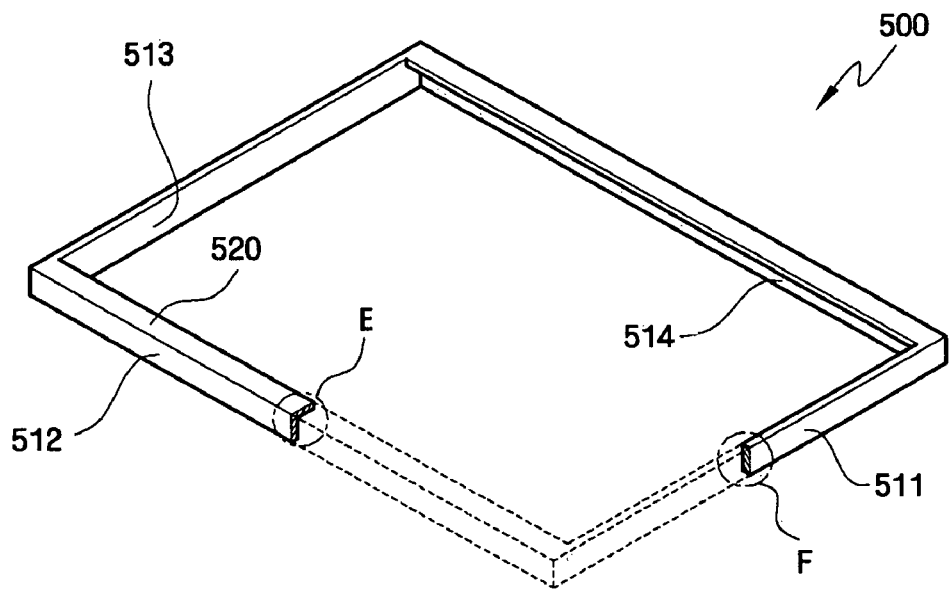
FIG. 5A is a partly cut-away perspective view illustrating an exemplary upper receiving container shown in FIG. 1.
Figure 5B:
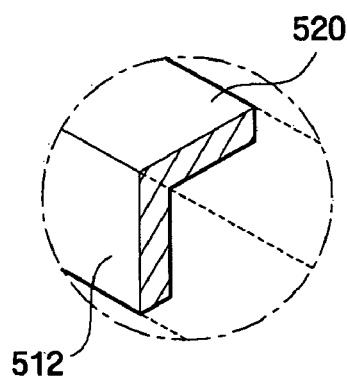
FIGS. 5B and 5C are enlarged perspective views of portions E and F, respectively, of FIG. 5A.
Figure 5C:
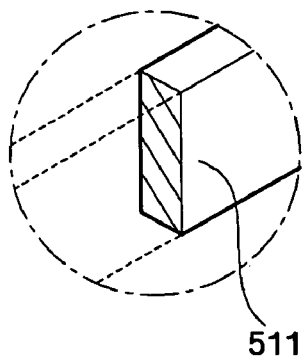

FIG. 5A is a partly cut-away perspective view illustrating an exemplary top receiving container shown in FIG. 1. FIGS. 5B and 5C are enlarged perspective views of portions E and F, respectively, of FIG. 5A.

Referring to FIGS. 2A, 2B, 5A, 5B, and 5C, the top receiving container 500 is positioned between the mold frame 300 and the front cover 600, and includes first, second, third, and fourth sidewalls 511, 512, 513 and 514 combined with the first, second, third, and fourth sidewalls 311, 312, 313 and 314 of the mold frame 300, respectively.

Here, the first sidewall 511 of the top receiving container 500 and the third sidewall 513 of the top receiving container 500 are positioned in the vicinity of the short sides of the LCD panel 110 and combined with the first and third sidewalls 311 and 313 of the mold frame 300. The first and third sidewalls 511 and 513 are plate-shaped and are formed lower than the protruding portion 320 formed on the first and third sidewalls 311 and 313 of the mold frame 300. Here, an exteriorly facing side of the protruding portions 320 formed on the first and third sidewalls 311 and 313 is exposed by the sidewalls 511 and 513, having a lower height as shown in FIG. 2A. The protruding portion 320 has a height of approximately 0.3 to 0.6 mm.

The second and fourth sidewalls 512 and 514 of the top receiving container 500 are combined with the second and fourth sidewalls 312 and 314 of the mold frame 300 and bent so as to fix the top surface of the LCD panel 110 in the vicinity of the long sides of the LCD panel 110, as shown in FIG. 2B. Here, the second and fourth sidewalls 512 and 514 of the top receiving container 500 are bent in an L-shape and securely fix the top surface of the LCD panel 110 with bent portion 520. Here, the second and fourth sidewalls 512 and 514 of the top receiving container 500 support/fix the LCD panel 110 received by the mold frame 300, thereby preventing fluctuation of the LCD panel 110.

The first through fourth sidewalls 511, 512, 513 and 514 of the top receiving container 500 may be combined with the first through fourth sidewalls 311, 312, 313 and 314 of the mold frame 300 by hook connection. For example, hooks (not shown) may be formed along surfaces of the sidewalls 511, 512, 513 and 514 and hook insertion holes (not shown), corresponding to the hooks, may be formed on the sidewalls 311, 312, 313 and 314. Accordingly, the mold frame 300 lifts upward from the top receiving container 500 so that the hooks are inserted into the hook insertion holes of the mold frame 300 to establish fastening of the top receiving container 500 with the mold frame 300.

Alternatively, the fastening of the top receiving container 500 with the mold frame 300 may be modified in various types using known methods.

The top receiving container 500 may be made of the same material as the bottom receiving container 400, for example, a metal such as aluminum (Al) or Al alloy.

Figure 6A:
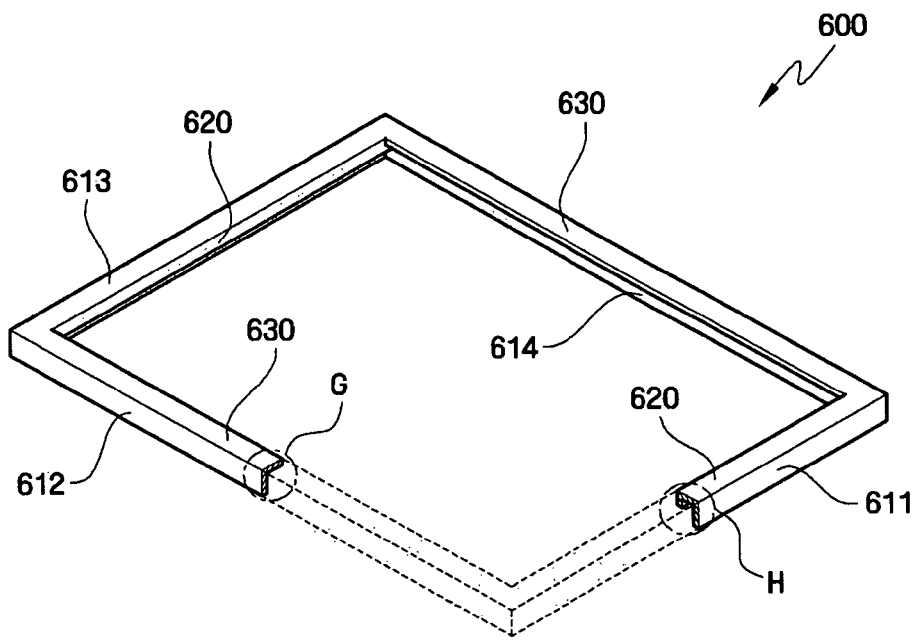
FIG. 6A is a partly cut-away perspective view illustrating an exemplary front cover shown in FIG. 1.
Figure 6B:
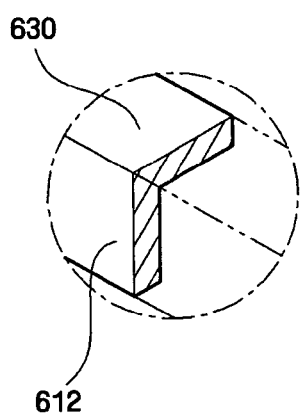
FIGS. 6B and 6C are enlarged perspective views of portions G and H, respectively, of FIG. 6A.
Figure 6C:
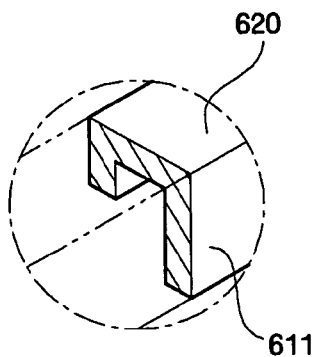

FIG. 6A is a partly cut-away perspective view illustrating an exemplary front cover shown in FIG. 1. FIGS. 6B and 6C are enlarged perspective views of portions G and H, respectively, of FIG. 6A.

Referring to FIGS. 2A, 2B, 6A, 6B, and 6C, the front cover 600 is positioned outside the mold frame 300, and is bent at a first bent portion 620, shown in FIG. 6C, so as to surround the protruding portion 320 of the mold frame 300 from the outer surface of the mold frame 300. Here, the distal end first bent portion 620 is in contact with the LCD panel 110 as shown in FIG. 2A. The front cover 600 includes first, second, third, and fourth sidewalls 611, 612, 613 and 614 and is combined with the rear cover 700 to complete the outer frame of the LCD 800. Inner surfaces of the sidewalls 611, 612, 613, 614 of the front cover 600 may surround outer surfaces of the rear cover 700.

As shown in FIG. 2A, the first bent portion 620 of the front cover 600 is engaged with the protruding portion 320 of the mold frame 300. Further, the front cover 600 includes the first bent portion 620 formed on the first and third sidewalls 611, 613 and bent in a U-shape, more particularly an upside-down U-shape, so as to surround the protruding portion 320 of the mold frame 300.

Here, the distal end of the first bent portion 620 is in contact with the top surface of the LCD panel 110. Preferably, the distal end of the first bent portion 620 overlaps with the light blocking pattern formed on the LCD panel 110.

In addition, the second and fourth sidewalls 612 and 614 are combined with the second and fourth sidewalls 512 and 514 of the top receiving container 500. Further, the second and fourth sidewalls 612 and 614 each include a second bent portion 630, as shown in FIGS. 2B and 6B, extending in a direction of the LCD panel 110 and bent in an L-shape. The horizontal portion of the second bent portion 630 may extend as far towards the LCD panel 110 as the bent portion 520.

Here, the first through fourth sidewalls 611, 612, 613 and 614 of the front cover 600 may be made of a relatively light material, e.g., a synthetic resin material, as compared to the bottom and top receiving containers 400 and 500 made of a metal.

The front cover 600 surrounds the front surface and sidewalls of the top receiving container 500 and is combined with the rear cover 700 from the rear surface of the bottom receiving container 400 to complete the outer frame of the LCD 800.

Figure 7A:
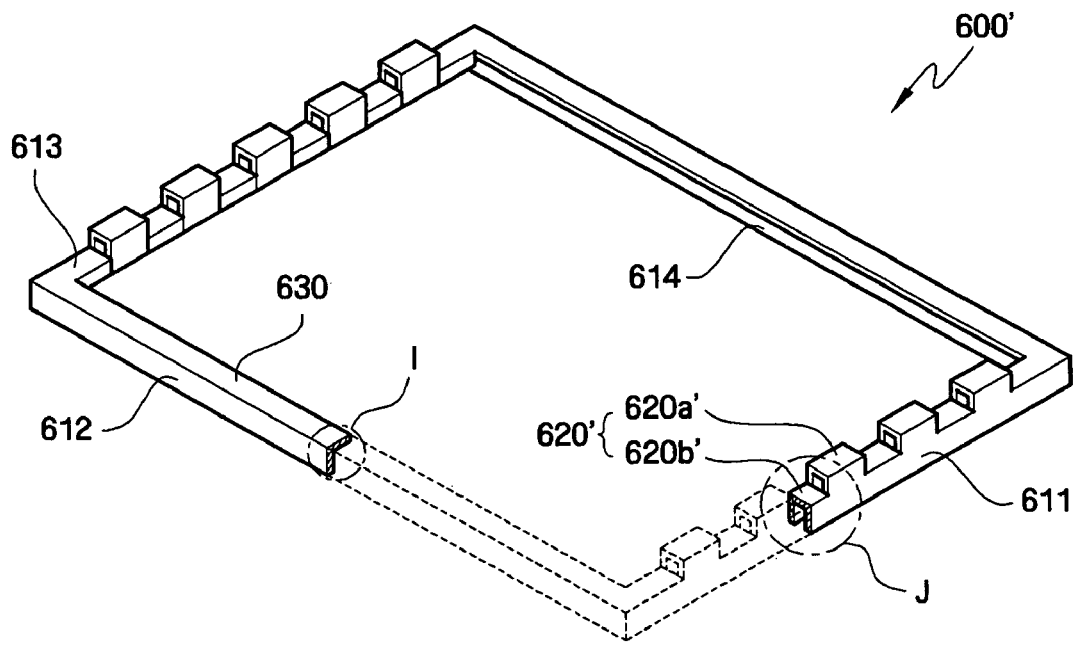
FIG. 7A is a partly cut-away perspective view illustrating a modified example of the exemplary front cover of FIG. 6A; and, FIGS. 7B and 7C are enlarged perspective views of portions I and J, respectively, of FIG. 7A.
Figure 7B:
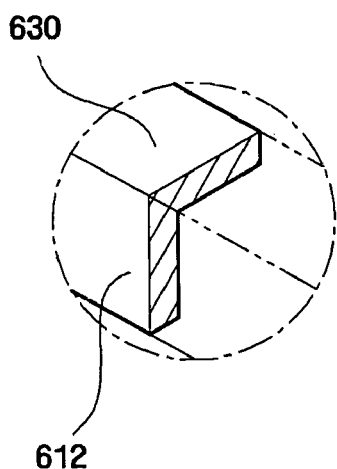
Figure 7C:
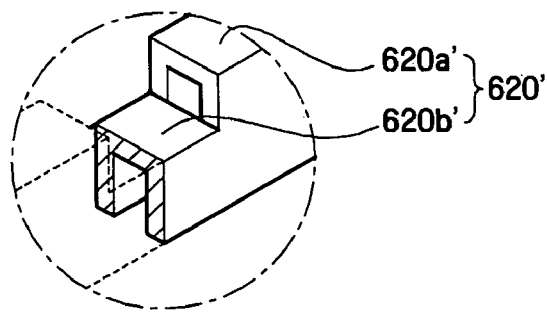

FIG. 7A is a partly cut-away perspective view illustrating a modified example of the exemplary front cover of FIG. 6. FIGS. 7B and 7C are enlarged perspective views of portions I and J, respectively, of FIG. 7A.

For brevity, components each having the same function for describing the embodiment shown in FIGS. 6A to 6C are respectively identified by the same reference numerals, and their repetitive description will be omitted.

In FIG. 7A, a front cover 600' is combined with the mold frame 300' shown in FIG. 4A. In the description that follows, the front cover 600' is explained in greater detail with reference to FIGS. 2A, 2B, 4A, 4C, 7A, 7B, and 7C.

Referring to FIGS. 2A, 2B, 4A, 4B, 4C, 7A, 7B, and 7C, the front cover 600' according to this exemplary embodiment includes a plurality of first bent portions 620' repeatedly formed at different heights to surround the protruding portions 320' of the mold frame 300'. The plurality of first bent portions 620' of the front cover 600' are shaped to surround the protruding portions 320' formed on the first and third sidewalls 311 and 313 of the mold frame 300' in a more secure manner.

Further, the front cover 600' includes first bent portions 620' bent in a U-shape, in particular an upside-down U-shape, so as to surround the protruding portions 320' of the mold frame 300'. The first bent portions 620' are alternately formed at different heights. In other words, the first bent portions 620' include third bent portions 620a' combined with the protruding portions 320' formed on the first and third sidewalls 311 and 313, and fourth bent portions 620b' combined with the portions of the first and third sidewalls 311 and 313 not having the protruding portions 320'. In this case, the third bent portions 620a' are in the vicinity of the fourth bent portions 620b' and are formed to be higher than the fourth bent portions 620b'.

The first bent portions 620' including the third bent portions 620a' and the fourth bent portions 620b' are also formed on the third sidewall 613 facing the first sidewall 611.

In addition, the distal ends of the third and fourth bent portions 620a' and 620b' are in contact with the top surface of the LCD panel 110. Preferably, the distal ends of the third and fourth bent portions 620a' and 620b' overlap with light blocking patterns formed on the LCD panel 110.

As described above, according to exemplary embodiments of the present invention, an LCD having a maximum effective display area can be attained by improving an assembling structure of the LCD.

In concluding the detailed description, those skilled in the art will appreciate that many variations and modifications can be made to the exemplary embodiments described herein without substantially departing from the principles of the present invention. Therefore, the disclosed exemplary embodiments of the invention are used in a generic and descriptive sense only and not for purposes of limitation.

What is claimed is:

1. A liquid crystal display comprising:
   a liquid crystal display panel assembly including a liquid crystal display panel, a data driver transmitting a data driving signal to the liquid crystal display panel, and a gate driver transmitting a gate driving signal to the liquid crystal display panel;
   a mold frame receiving the liquid crystal display panel assembly therein, the mold frame including:
      a first sidewall including a protruding portion protruding on a top of the first sidewall, the protruding portion formed to be higher than the liquid crystal display panel assembly; and
      a second sidewall which is different from the first sidewall, and including a supporting portion on an inner surface thereof, the supporting portion supporting the liquid crystal display panel assembly; and
   a front cover positioned outside the mold frame, a first bent portion of the front cover surrounding the protruding portion, and a distal end of the first bent portion contacting the liquid crystal display panel,
   wherein a cross-section taken in an orthogonal direction to a length direction of the first sidewall is linear, and a cross-section taken in an orthogonal direction to a length direction of the second sidewall is T-shaped, and
   wherein the protruding portion is only on the first sidewall and not on the second sidewall, and the supporting portion is only on the second sidewall and not on the first sidewall.

2. The liquid crystal display of claim 1, wherein the gate driver is patterned in an integrated circuit type and the protruding portion is in a vicinity of the gate driver.

3. The liquid crystal display of claim 1, further comprising a top receiving container positioned between the mold frame and the front cover, a portion of the top receiving container covering a portion of a top surface of the mold frame and securely fixing the liquid crystal display panel relative to the mold frame.

4. The liquid crystal display of claim 3, wherein the top receiving container comprises:
   a first sidewall of the top receiving container combined with a first sidewall of the mold frame, the first sidewall of the top receiving container formed to be lower than the protruding portion; and a second sidewall of the top receiving container combined with a second sidewall of the mold frame, the second sidewall of the top receiving container bent and securely fixing a top surface of the liquid crystal display panel relative to the mold frame.

5. The liquid crystal display of claim 4, wherein the second sidewall of the top receiving container is bent in an L-shape.

6. The liquid crystal display of claim 1, wherein the front cover comprises:
a first sidewall of the front cover having the first bent portion bent in a U-shape and surrounding the protruding portion; and
a second sidewall of the front cover having a second bent portion, bent in an L-shape, and extending in a direction of the liquid crystal display panel.

7. The liquid crystal display of claim 1, further comprising a backlight assembly positioned below the liquid crystal display panel assembly and within the mold frame, the backlight assembly supplying the liquid crystal display panel assembly with light.

8. The liquid crystal display of claim 7, further comprising an adhesive fixing material or a fixing tape interposed between the liquid crystal display panel in a vicinity of the protruding portion and the backlight assembly.

9. The liquid crystal display of claim 8, further comprising a light blocking pattern formed along an edge of the liquid crystal display panel defining an effective display area, wherein the adhesive fixing material or the fixing tape is overlapped by the light blocking pattern.

10. The liquid crystal display of claim 7, further comprising a bottom receiving container receiving the backlight assembly and disposed within the mold frame.

11. The liquid crystal display of claim 1, further comprising a light blocking pattern formed along an edge of the liquid crystal display panel defining an effective display area, wherein the gate driver overlaps with the light blocking pattern.

12. The liquid crystal display of claim 1, wherein the protruding portion has a height of approximately 0.3 to approximately 0.6 mm.

13. The liquid crystal display of claim 1, wherein a plurality of the protruding portion is formed on top of at least one of the sidewalls of the mold frame.

14. A liquid crystal display comprising:
a liquid crystal display panel assembly including a rectangular liquid crystal display panel having a long side and a short side, a data driver attached to the long side of the liquid crystal display panel and transmitting a data driving signal to the liquid crystal display panel, and a gate driver patterned in an integrated circuit type on the short side of the liquid crystal display panel and transmitting a gate driving signal to the liquid crystal display panel;
a mold frame receiving the liquid crystal display panel assembly therein and including a protruding portion protruding on top of a sidewall of the mold frame in a vicinity of the short side of the liquid crystal display panel, the protruding portion formed to be higher than the liquid crystal display panel assembly;
a front cover positioned outside the mold frame, a first bent portion of the front cover surrounding the protruding portion, and a distal end of the first bent portion contacting the liquid crystal display panel; and
a top receiving container positioned between the mold frame and the front cover, and securely fixing the liquid crystal display panel, the top receiving container also including a plate-shaped sidewall in a vicinity of the short side of the liquid crystal display panel, the plate-shaped sidewall formed to be lower than the protruding portion;
wherein
the top receiving container is closely positioned outside the mold frame, and
the front cover is positioned outside the top receiving container.

15. The liquid crystal display of claim 14, wherein the mold frame comprises:
a first sidewall of the mold frame having the protruding portion formed thereon; and
a second sidewall of the mold frame having a supporting portion formed on its inner surface, the supporting portion supporting the liquid crystal display panel.

16. The liquid crystal display of claim 14, wherein the top receiving container comprises:
a first sidewall of the top receiving container combined with a first sidewall of the mold frame, the first sidewall of the top receiving container formed to be lower than the protruding portion; and
a second sidewall of the top receiving container combined with a second sidewall of the mold frame, the second sidewall of the top receiving container bent and securely fixing a top surface of the liquid crystal display panel relative to the mold frame.

17. The liquid crystal display of claim 16, wherein the second sidewall of the top receiving container is bent in an L-shape.

18. The liquid crystal display of claim 14, wherein the front cover comprises:
a first sidewall of the front cover having the first bent portion bent in a U-shape and surrounding the protruding portion; and
a second sidewall of the front cover having a second bent portion bent in an L-shape and extending in a direction of the liquid crystal display panel.

19. The liquid crystal display of claim 14, further comprising a backlight assembly positioned below the liquid crystal display panel assembly and within the mold frame, the backlight assembly supplying the liquid crystal display panel assembly with light.

20. The liquid crystal display of claim 19, further comprising an adhesive fixing material or a fixing tape interposed between the short side of the liquid crystal display panel in a vicinity of the protruding portion and the backlight assembly.

21. The liquid crystal display of claim 20, further comprising a light blocking pattern formed along an edge of the liquid crystal display panel defining an effective display area, wherein the adhesive fixing material or the fixing tape is overlapped by the light blocking pattern.

22. The liquid crystal display of claim 19, further comprising a bottom receiving container receiving the backlight assembly and disposed within the mold frame.

23. The liquid crystal display of claim 14, further comprising a light blocking pattern formed along an edge of the liquid crystal display panel defining an effective display area, wherein the gate driver overlaps with the light blocking pattern.

24. The liquid crystal display of claim 14, wherein the protruding portion has a height of approximately 0.3 to approximately 0.6 mm.

25. A method of assembling a liquid crystal display, the method comprising:
providing a mold frame having a protruding portion extending upwardly from a first sidewall, and a supporting portion extending inwardly from a second sidewall which is different from the first sidewall, wherein a cross-section taken in an orthogonal direction to a length direction of the first sidewall is linear, and a cross-section taken in an orthogonal direction to a length direction of the second sidewall is T-shaped, and wherein the protruding portion is only on the first sidewall and not on the second sidewall, and the supporting portion is only on the second sidewall and not on the first sidewall;

placing a liquid crystal display panel on the supporting portion; and, positioning a front cover outside of the mold frame, the front cover having a first sidewall of the front cover corresponding to the first sidewall of the mold frame and a first bent portion extending from the first sidewall of the front cover, a distal end of the first bent portion contacting the liquid crystal display panel.

26. The method of claim 25, further comprising, prior to positioning the front cover, positioning a top receiving container outside of the mold frame, the top receiving container having a first sidewall of the top receiving container corresponding to the first sidewall of the mold frame and a second sidewall of the top receiving container corresponding to the second sidewall of the mold frame, the second sidewall of the top receiving container bent in an L-shape and securing an edge portion of the liquid crystal display panel between a bent portion of the second sidewall of the top receiving container and the supporting portion of the mold frame.

27. The method of claim 25, wherein the protruding portion extends upwardly higher than the liquid crystal panel.

* * * * *